P. PAULSEN.
STOCK WATERER.
APPLICATION FILED APR. 4, 1919.

1,312,350.

Patented Aug. 5, 1919.
3 SHEETS—SHEET 1.

Witness

Inventor
P. Paulsen
By his Attorneys

THE COLUMBIA PLANOGRAPH CO., WASHINGTON, D. C.

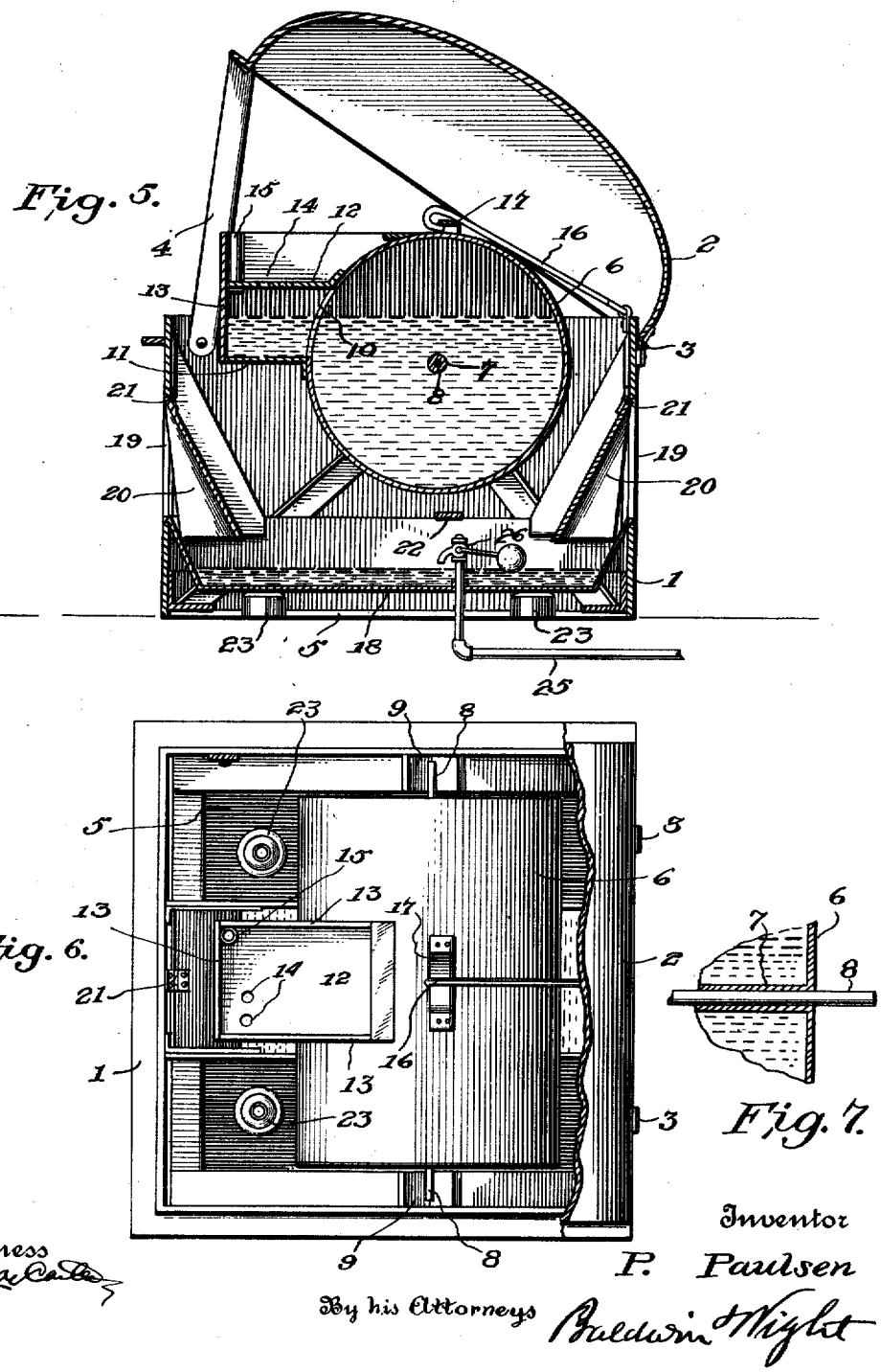

UNITED STATES PATENT OFFICE.

PETER PAULSEN, OF SCHLESWIG, IOWA.

STOCK-WATERER.

1,312,350.     Specification of Letters Patent.     Patented Aug. 5, 1919.

Application filed April 4, 1919. Serial No. 287,490.

*To all whom it may concern:*

Be it known that I, PETER PAULSEN, a citizen of the United States, residing at Schleswig, in the county of Crawford and State of Iowa, have invented certain new and useful Improvements in Stock-Waterers, of which the following is a specification.

This invention relates to stock waterers of the kind in which a rotary reservoir or tank is mounted to turn about a horizontal axis within the casing, which is heated to prevent water in the reservoir from freezing during freezing weather, and which delivers to a drinking trough in the lower part of the casing to which access is had through suitable openings in the side of the casing.

The object of my invention is to provide a stock waterer of this class in which the reservoir may be filled without providing a special filling opening in the cover, and without entirely removing the cover or lifting it to a vertical position or throwing it back from its position above the casing.

A further object of the invention is to construct a stock waterer of this class in such manner that the reservoir may be readily turned from feeding to filling position and vice-versa without detaching the hoods or shields usually employed to protect the openings in the sides of the casing through which access is had to the drinking trough.

A still further object of the invention is to provide means for insuring the proper and easy filling of the reservoir with simultaneous escape of air therefrom, and for easy and reliable feeding of water from the reservoir to the trough while air is being admitted to the reservoir to replace the water drawn therefrom.

In the accompanying drawings:—

Fig. 5 shows a vertical section of the waterer with the reservoir in filling position.

Fig. 6 is a top plan view of the waterer shown in Fig. 5 with the cover partially broken away.

Fig. 7 is a detail view showing the manner in which the reservoir is pivotally connected with the casing.

Figure 1:
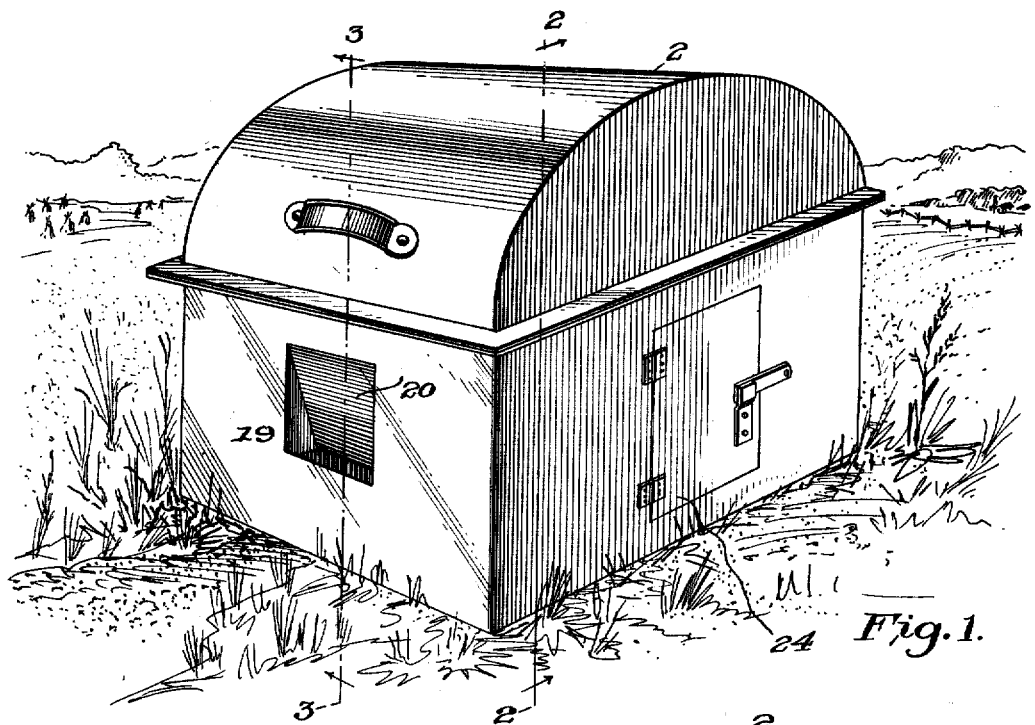
Figure 1 is a perspective view of a stock waterer embodying my invention.
Figure 2:
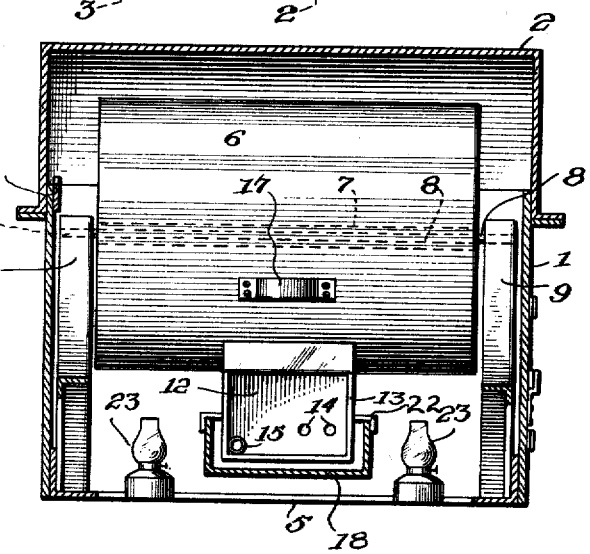
Fig. 2 shows a vertical section thereof on the line 2—2 of Fig. 1.

The casing 1 is for the most part closed. It is provided with a door 24 through which access may be had to its interior and it is also provided with openings 19 through which access may be had by animals to the drinking trough. These openings are shielded by hoods 20 which are hinged to the casing at 21. A cover 2 is hinged to the casing at 3 and may be raised and lowered by means of a suitable handle as shown in Fig. 1. When raised it may be held open by means of a brace 4 pivotally connected with the casing in such manner that it may be turned to the position shown in Fig. 5 to hold the cover open, or may be lowered to the position shown in Fig. 3 to allow the cover to be lowered. The drinking trough 18 is supported in any suitable manner in the lower portion of the casing, and lamps 23 are employed for heating the interior of the casing in freezing weather. The cylindrical reservoir 6 is mounted within the casing to turn about a horizontal axis. Preferably as shown a sleeve 7 extends centrally through the reservoir and through this sleeve extends a rod 8 supported by standards 9 within the casing and about which the reservoir turns. The reservoir may be held in filling position by means of a catch 16 hinged to the casing and engaging a loop 17 on the periphery of the reservoir. The reservoir is filled and emptied through an opening 10 in its periphery. This opening is surrounded by a hood 11 which is divided into two chambers by a partition or diaphragm 12. The inner chamber communicates directly with the reservoir through the opening 10. The partition 12 is provided with an opening 14 which, when the reservoir is in filling position, allows water supply to the outer chamber 14 to pass to the inner chamber and thence to the reservoir. The other opening is provided with a short pipe 15 which extends through the partition into the inner chamber and to the outer portion of the outer chamber. This pipe serves to transmit air passing from the reservoir outward through the opening 10. It will be observed that the outer end of the pipe 15 is above any water level which might be produced in the outer chamber so that air will at all times freely pass through it. The hood is closed, as clearly indicated in the drawings, and the outer wall 13 of the hood is spaced from the periphery of the reservoir in such manner that it does not come in contact with the hoods or shields 20 when the reservoir is being turned from filling to feeding position or vice versa, it not being necessary to remove the shields or turn them either inward or outward to permit such movement of the reservoir.

Figure 3:
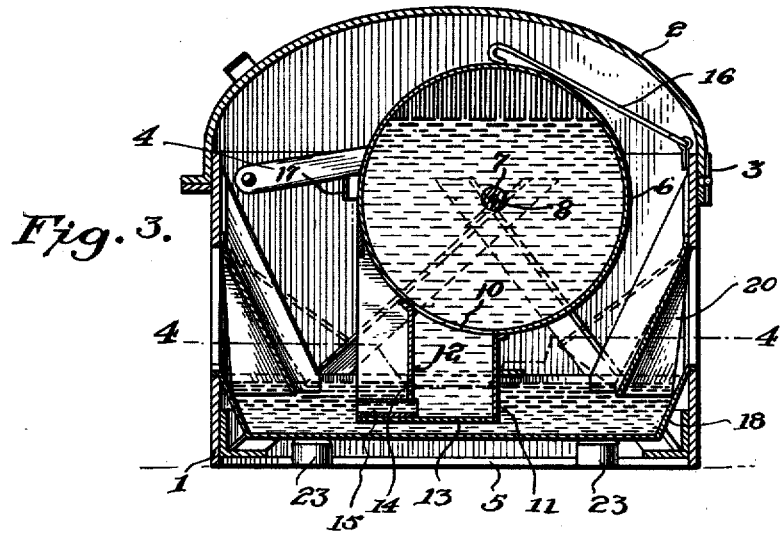
Fig. 3 shows a vertical section on the line 3—3 of Fig. 1, the reservoir being in feeding position.
Figure 4:
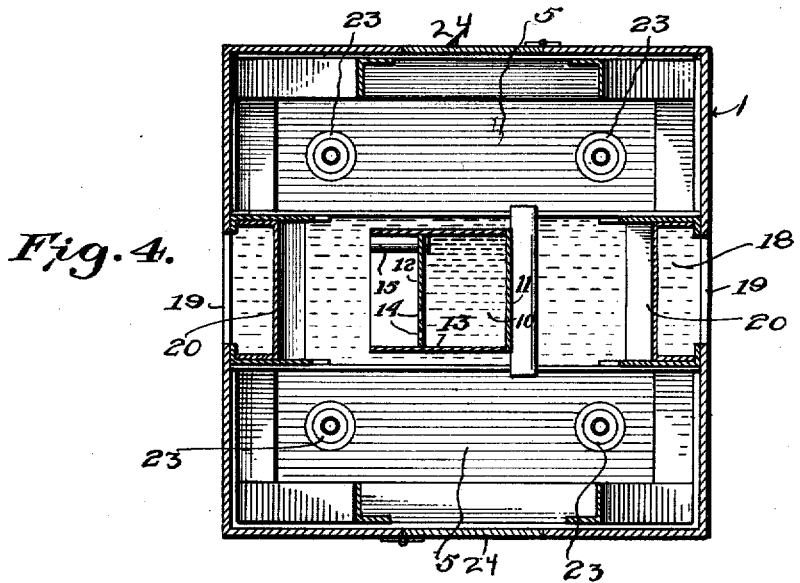
Fig. 4 shows a horizontal section on the line 4—4 of Fig. 3.

After the reservoir has been filled, the catch 16 may be detached and the reservoir may be lowered to the position shown in Fig. 3, its downward movement being arrested by a stop 22 of suitable construction. When in feeding position the outer portion of the hood is disposed within the trough 18, the pipe 15 being submerged and serving as a conduit of water from the reservoir to the trough while the opening 14 serves for the escape of air. The loop 17 not only serves to provide means for engaging the catch 16 with the reservoir, but may be used as a handle when lifting and lowering the reservoir.

It will be observed that when moving from feeding to filling position it is only necessary to give the reservoir a quarter turn from the position shown in Fig. 3 to that shown in Fig. 5, and when thus turned the outer chamber is in position to receive water supplied to it and it will also be observed that by reason of this arrangement it is only necessary to lift the cover a short distance, and it is not necessary to provide the cover with a special filling opening.

In some cases the waterer may be used where a water supply system through pipes is employed, in which case the pipe 25 may be led to the interior of the trough and be provided with a valve 26 operated by a float as indicated, which will automatically maintain a uniform water level in the trough, but where a water supply through a pipe system is not available the waterer is filled through the hood in the manner before explained.

I claim as my invention:—

1. A stock waterer, comprising a casing, a drinking trough supported in the lower portion of the casing, a closed cover for the casing, a brace for holding the cover in raised position, a cylindrical reservoir mounted within the casing to turn about a horizontal axis and provided with an opening in its periphery for the flow of water, and a hood outside the reservoir surrounding said opening provided with an inner closed chamber communicating with the reservoir through said opening, and an outer open chamber separated from the inner chamber by a partition above the water line in the reservoir when the latter is in filling position and having openings for the passage of air and water, and means for holding the reservoir in filling position with the hood and partition projecting horizontally from the reservoir.

2. A stock waterer, comprising a casing having openings in its sides, hoods protecting these openings, a drinking trough mounted in the lower portion of the casing, a cover hinged to the casing, a brace for holding the cover in open position, a cylindrical reservoir mounted within the casing to turn about a horizontal axis, and having an opening in its periphery, a hood surrounding the opening extending laterally from the reservoir and having an inner closed chamber and an outer open chamber separated from the inner chamber by a diaphragm having openings in it for the passage of air and water, a pipe applied to one of said openings which opens into the inner chamber and extends through the outer chamber, and means for holding the reservoir in filling position with the hood disposed in a horizontal plane at one side of the reservoir.

3. A stock waterer, comprising a casing, a drinking trough supported in the lower portion of the casing, a cylindrical reservoir mounted within the casing to turn about a horizontal axis and provided with an opening in its periphery for the flow of water, a hood outside the reservoir surrounding said opening provided with an inner closed chamber communicating with the reservoir through said opening, and an outer open chamber separated from the inner chamber by a partition located above the water level of the reservoir when the latter is in filling position and having openings for the passage of air and water, a pipe applied to one of said openings which opens into the inner chamber and extends through the outer chamber, and means for holding the reservoir in filling position with the hood disposed in a horizontal plane at one side of the reservoir and with said partition above the water level in the reservoir.

In testimony whereof, I have hereunto subscribed my name.

PETER PAULSEN.

Copies of this patent may be obtained for five cents each, by addressing the "Commissioner of Patents, Washington, D. C."